No. 827,800. PATENTED AUG. 7, 1906.
W. HAAS, K. GERZÁBEK & A. LAMPEL.
MACHINE FOR CUTTING OR INDENTING PIPES.
APPLICATION FILED MAR. 26, 1906.
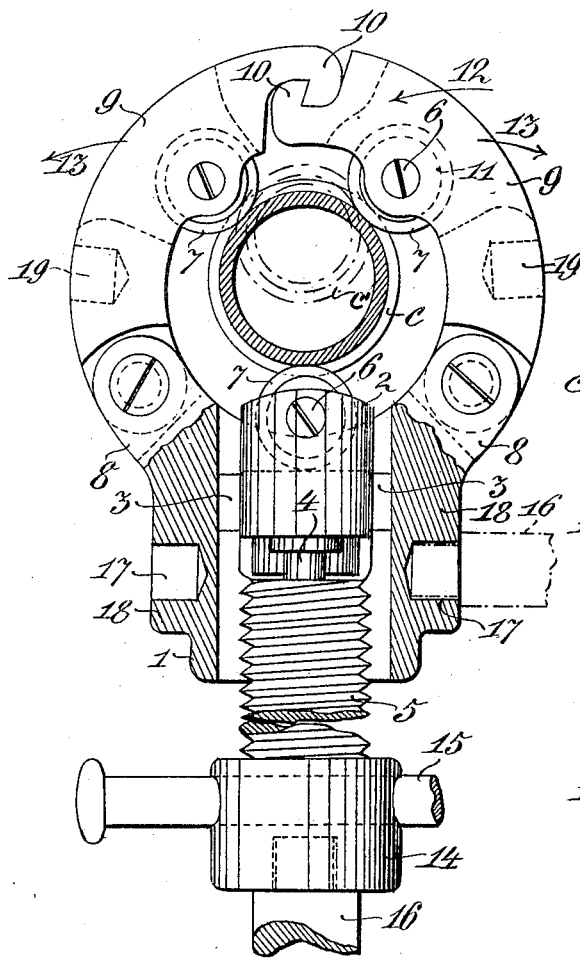
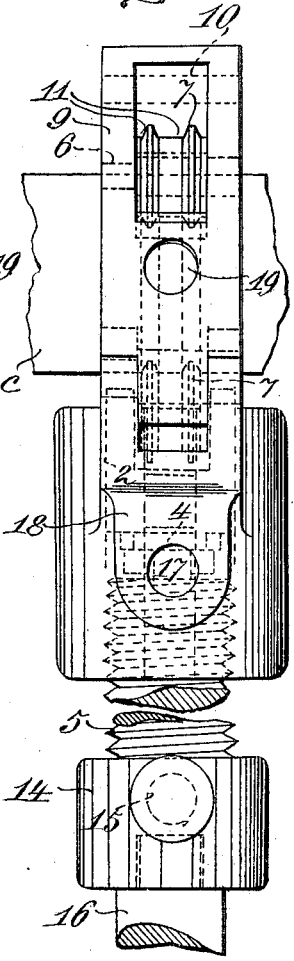
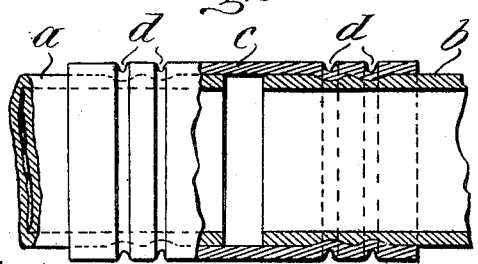
Witnesses
A. J. Hadden
S. Hora
Inventors
Wilhelm Haas
Karl Gerzábek
Alois Lampel
By his Attorney
R. Hadden

UNITED STATES PATENT OFFICE.

WILHELM HAAS, KARL GERZÁBEK, AND ALOIS LAMPEL, OF FLORIDSDORF, NEAR VIENNA, AUSTRIA-HUNGARY.

MACHINE FOR CUTTING OR INDENTING PIPES.

No. 827,800.     Specification of Letters Patent.     Patented Aug. 7, 1906.

Application filed March 26, 1906. Serial No. 308,134.

*To all whom it may concern:*

Be it known that we, WILHELM HAAS, KARL GERZÁBEK, and ALOIS LAMPEL, subjects of the Emperor of Austria-Hungary, residing at Floridsdorf, near Vienna, in the Empire of Austria-Hungary, have invented certain new and useful Improvements in Machines for Cutting or Indenting Pipes, of which the following is a specification.

This invention relates to an improved tool for cutting pipes or tubes or for producing grooves, constrictions, or the like in the circumference thereof.

The known pipe-cutters, pipe-wrenches, and similar tools for treating the circumferences of pipes, comprising more than two pivoted arms supporting disks or wheels, have the disadvantage that when pressure is applied at one point most of the wheels or disks are removed from the pipe instead of being caused to act on the latter. In the improved tool this disadvantage is obviated by means of two curved arms pivotally connected to a guide and adapted to be interlocked at their free ends by means of suitable teeth. Recesses are provided in the said guide and arms for the insertion of the rod or lever by means of which the tool is operated.

The invention is illustrated in the annexed drawings, which represent a tool comprising wheels or disks adapted to produce circumferential grooves or indentations in pipes of tubes.

Figure 1 is a side view, partly in section; Fig. 2, an edge view, and Fig. 3 represents a specimen of work executed by means of the improved tool.

1 is a guide provided with grooves engaged by lateral projections 3 of a longitudinally-movable but not rotatable part 2. A T-shaped slot at the lower end of the latter is engaged by a correspondingly-shaped head 4 of a screw 5, which engages a threaded portion of the guide 1. At the upper end of the part 2 an exchangeable roller 7 is supported by means of an axle 6. At each side of the guide 1 two parallel lugs 8 are provided, between which is pivoted a curved arm 9, and the two arms 9 are provided at their upper ends with teeth 10, adapted to rigidly interlock the said arms. Each of the latter supports, by means of an axle 6, a roller 7, similar to the roller supported by the part 2.

The shape and construction of the rollers 7 used depends upon the purpose for which the tool is to be employed. Each of the rollers 7 (shown in the drawings) is provided with two blunt circumferential ribs adapted to produce grooves in the circumference of the pipe, the depth of said grooves being limited by the abutment-surfaces 11 of the roller. It is obvious that each of the rollers 7 might be provided with a single rib or with more than two ribs, if desired. For cutting pipes or tubes disks or wheels with sharp circumferential edges are used.

In Figs. 1 and 2 a tube $c$ is shown in contact with the rollers 7, the said tube being of the maximum diameter which can be dealt with with the pair of arms 9 illustrated. Tubes of smaller diameter can be dealt with with the same pair of arms, as indicated in Fig. 1 by the dotted lines $c'$. For treating tubes of larger diameter a larger pair of arms 9 are used. Two guides 1 and four arms 9 allow, for example, of dealing with tubes ranging in diameter up to four inches.

The method of using the tool will be described with reference to the specimen of work shown in Fig. 3. The tubular part $c$ is a union which is to be used for coupling the ends of two pipes $a$ and $b$, the junction being made by producing circumferential constrictions or indentations $d$ in the part $c$, and thus causing portions of the latter to bite into the outer surfaces of the pipes $a$ and $b$. The constrictions $d$ are produced by means of the tool shown in Figs. 1 and 2 after the insertion of the pipes $a$ and $b$ into the union. For this purpose the arms 9 are unlocked by depressing one of them in the direction of the arrow 12 (shown in Fig. 1) and moving them apart in the directions indicated by the arrows 13 in the same figure. The union $c$ is then placed between the said arms 9, and the latter are thereupon moved together again and relocked. The screw 5 is then rotated by means of a pin 15 passing through a hole in the head 14 of said screw until the union $c$ is gripped with suitable pressure between the three rollers 7. The entire tool is then rotated about the union by means of a rod or lever 16, engaging a hole in the under part of the screw-head 14. If necessary, the screw 5 is tightened up after an interval, the rotation of the tool being thereupon continued. If the work is surrounded by sufficient open space, it is obvious that the tool can during the indenting or cutting action be caused to traverse a complete circle around the work, whereas if the work is located close to a wall or in the angle between two walls placed at ninety degrees to each other a rocking movement must be imparted to the tool. For this purpose the lever 16 can be caused to engage recesses 19 in the arms 9 or recesses 17 in cheeks 18, formed on the guide 1, so that the tool can be rotated to an extent sufficient to cause each roller 7 to roll through an arc subtending an angle of more than one hundred and twenty degrees. Complete circular action of the three coöperating rollers is thus secured. If necessary, a temporary recess can be made in the adjacent wall to afford the necessary clearance for the tool, the said recess being filled up with plaster or the like when the work has been done. This obviates the necessity of removing or detaching the pipes before applying the tool.

What we claim as our invention, and desire to secure by Letters Patent of the United States, is—

1. A tool for cutting or indenting pipes comprising in combination a guide, curved arms pivoted to said guide between which the work is placed, interlockable teeth at the free ends of said arms, tools carried by the latter, a block slidable in the guide, a tool carried by said block, and a screw acting on said block for holding the tools in contact with the work, substantially as described.

2. A tool for cutting or indenting pipes comprising in combination a guide, curved arms pivoted to said guide between which the work is placed, interlockable teeth at the free ends of said arms, tools carried by the latter, a block slidable in the guide, a tool carried by said block, a screw acting on said block for holding the tools in contact with the work and means for rotating the entire tool axially about the work, substantially as described.

3. A tool for cutting or indenting pipes comprising in combination a guide, curved arms pivoted to said guide between which the work is placed, interlockable teeth at the free ends of said arms, rotatable tools mounted in the latter, a block slidable in the guide, a tool carried by said block, a screw acting on said block for holding the tools in contact with the work and means for continuously and intermittently rotating the entire tool axially about the work, substantially as described.

In witness whereof we have signed this specification in the presence of two witnesses.

WILHELM HAAS.
KARL GERZÁBEK.
ALOIS LAMPEL.

Witnesses:
HANS PAPPENHEIM,
ALVESTO S. HOGUE.